(12) United States Patent
Phoenix et al.

(10) Patent No.: US 10,688,466 B2
(45) Date of Patent: Jun. 23, 2020

(54) METHOD AND SYSTEM FOR EXTRACTING STRANDED GAS FROM UNDERWATER ENVIRONMENTS, CONVERTING IT TO CLATHRATES, AND SAFELY TRANSPORTING IT FOR CONSUMPTION

(71) Applicant: CENTURY FATHOM, INC., Seabrook, TX (US)

(72) Inventors: Stuart L. Phoenix, Ithaca, NY (US); Michael T. Kezirian, Seabrook, TX (US)

(73) Assignee: CENTURY FATHOM, INC., Seabrook, TX (US)

( * ) Notice: Subject to any disclaimer, the term of this patent is extended or adjusted under 35 U.S.C. 154(b) by 0 days.

(21) Appl. No.: 15/766,801

(22) PCT Filed: Oct. 7, 2016

(86) PCT No.: PCT/US2016/055912
§ 371 (c)(1),
(2) Date: Apr. 6, 2018

(87) PCT Pub. No.: WO2017/062721
PCT Pub. Date: Apr. 13, 2017

(65) Prior Publication Data
US 2018/0290124 A1 Oct. 11, 2018

Related U.S. Application Data

(60) Provisional application No. 62/239,369, filed on Oct. 9, 2015.

(51) Int. Cl.
| | | |
|---|---|---|
| *B01J 19/00* | (2006.01) | |
| *B01J 19/24* | (2006.01) | |
| *B01J 3/04* | (2006.01) | |
| *B01J 4/00* | (2006.01) | |
| *C10L 3/10* | (2006.01) | |
| *E21B 43/01* | (2006.01) | |
| *C10L 3/06* | (2006.01) | |

(52) U.S. Cl.
CPC ............ *B01J 19/2465* (2013.01); *B01J 3/04* (2013.01); *B01J 4/004* (2013.01); *C10L 3/10* (2013.01); *B01J 2219/0011* (2013.01); *B01J 2219/00087* (2013.01); *C10L 3/06* (2013.01); *E21B 2043/0115* (2013.01)

(58) Field of Classification Search
CPC .................................................. B01J 19/2465
USPC ........................................................ 585/15
See application file for complete search history.

(56) References Cited

U.S. PATENT DOCUMENTS

| | | | |
|---|---|---|---|
| 5,536,893 A | 7/1996 | Gudmundsson | |
| 5,941,096 A | 8/1999 | Gudmundsson | |
| 6,028,234 A * | 2/2000 | Heinemann | C10L 3/08 137/13 |
| 2006/0272805 A1* | 12/2006 | O'Malley | E21B 28/00 166/177.2 |
| 2008/0135257 A1* | 6/2008 | Zhang | E21B 43/0122 166/352 |
| 2010/0048963 A1* | 2/2010 | Jones | E21B 43/34 585/15 |
| 2010/0325955 A1* | 12/2010 | Watanabe | C10L 3/06 48/78 |
| 2012/0260839 A1 | 10/2012 | Maher | |
| 2014/0100295 A1* | 4/2014 | Chinn | B01J 12/00 518/705 |
| 2017/0037720 A1* | 2/2017 | Moore | E21B 43/36 |

OTHER PUBLICATIONS

Extended European Search Report issued in EP16854391.6 dated Jun. 7, 2019 (12 pages).
Dawe et al., "Hydrate Technology for Transporting Natural Gas", Engineering Journal of the University of Qatar, vol. 16, 2006, pp. 11-18.
Gudmundsson et al., "Transport of Natural Gas as Frozen Hydrate", Proceedings of the Fifth (1995) International Offshore and Polar Engineering Conference, The Hague, The Netherlands, Jun. 11-16, 1995 (8 pages).
Render et al., "Methane Hydrate Pellet Transport Using the Self-Preservation Effect: A Techno-Economic Analysis", Energies, 2012, 5:2499-2523.
Satoo, Nakai, "Development of Natural Gas Hydrate (NGH) Supply Chain", World Gas Conference, Jun. 8, 2012.

* cited by examiner

*Primary Examiner* — Sharon Pregler
(74) *Attorney, Agent, or Firm* — FisherBroyles, LLP; J. David Smith

(57) ABSTRACT

The invention provides a method and system for extracting stranded gas (such as natural gas or hydrogen) or a mixture of oil and natural gas from a subterranean environment such as beneath the ocean floor and converting it into a solid hydrate such as a clathrate featuring a) extracting stranded gas (such as natural gas or hydrogen) or a mixture of oil and natural gas; b) optionally separating the natural gas from the mixture of oil and natural gas in a first tank or vessel; c) transporting the stranded gas to a second tank or vessel; d) introducing sea water into the second tank or vessel; e) mixing the stranded gas and water to form a clathrate hydrate/water slurry; f) removing excess water from the clathrate hydrate slurry to form a solid comprising a clathrate hydrate; and g) processing the solid comprising a clathrate hydrate into a transportable form; and h) optionally collecting the gas into a transportable vessel.

11 Claims, 6 Drawing Sheets

SHELL PRELUDE FLNG FACILITY

KEY FACTS
• The Prelude facility will be 488m long and 74m wide
• It will stay moored in water 250m deep for 25 years
• First production in 2017 of at least 3.6 million tonnes of LNG per year
• It will create 1000 jobs and add $45 billion to the economy

METHOD AND SYSTEM FOR EXTRACTING STRANDED GAS FROM UNDERWATER ENVIRONMENTS, CONVERTING IT TO CLATHRATES, AND SAFELY TRANSPORTING IT FOR CONSUMPTION

CROSS REFERENCE TO RELATED APPLICATIONS

This application is a 371 national phase of International Application No. PCT/US2016/055912 filed Oct. 7, 2016, which claims priority to U.S. Application No. 62/239,369 filed Oct. 9, 2015. The entire contents of these applications are hereby incorporated herein by reference.

FIELD OF THE INVENTION

This invention relates to extracting stranded gas such as natural gas or hydrogen from subterranean environments such as the deep sea. Further, the invention relates to separating oil and stranded gas and converting the stranded gas into a readily transportable form.

BACKGROUND OF THE INVENTION

Gas clathrate hydrates are nonstoichiometric crystalline solids formed from the reaction of water and gas under certain conditions of relatively high pressure and low temperature. (See, e.g. Sloan et al., *Clathrate Hydrates of Natural Gases*. 3rd ed.; CRC Press, Taylor & Francis Group: Boca Raton, Fla., 2008) Some efforts have been made in developing natural gas hydrate (NGH) off-shore and on land supply chains to efficiently transport natural gas hydrates to sites for re-gasification and eventual consumption. (See, e.g. Gudmundsson et al., *Transport of Natural Gas as Frozen Hydrate*. International Society of Offshore and Polar Engineers, 1995; Nogami et al., *Development Of Natural Gas Supply Chain By Means Of Natural Gas Hydrate (NGH)*. International Petroleum Technology Conference: 2008; Rehder et al., *Energies* 2012; 5(7):2499-2523; Tamsilian et al., *J. Dispersion Sci. Technol.* 2013; 34(2):259-267). It would be desirable to find safe, efficient and environmentally friendly ways of obtaining stranded gas, such as natural gas or hydrogen, from underwater environments and safely transporting it for consumption. The research literature often focuses on the formation of methane clathrate hydrates (MCH) since methane is the primary component of natural gas. Yet, depending on the origin, the range of possible gas composition may range from nearly pure methane to complex mixtures, rich in heavier volatile hydrocarbons. The processing described herein more generally refers to formation of natural gas clathrate hydrate (NGCH) where the starting natural gas may be about 85% methane, 10% ethane and 5% propane by mass. The process may be easily adapted to other compositions. One key aspect is that the formation of NGCH from natural gas mixtures generally requires less hydrostatic pressure at the same temperature than the formation of MCH from pure methane (FIG. 1). Also, other less typical or artificially blended hydrocarbon gas mixtures, involving less methane and more ethane, propane, butane and iso-pentane, etc., also form solid clathrate hydrates and the higher the proportion of these higher molecular weight gas components, the lower the pressure required. However, the temperature range for clathrate formation becomes much narrower and in the case where the formation from pure butane requires water temperature below 4° C. (FIG. 2) for the range of temperatures and pressures required for clathrate hydrate formation from these pure hydrocarbon gasses.

Fundamental to MCH and NGCH processing is to take advantage of water temperatures of 6° C. or lower at the ocean floor below 800 meters depth, where the corresponding pressure is 8.24 MPa (~1200 psi) (FIG. 1). At such pressures and depths, methane gas when bubbled into sea water very quickly forms small MCH spheres and flakes as does natural gas (See, e.g. Romer et al., *Journal of Geophysical Research: Oceans* 2012; 117; Warzinski et al., *Geophysical Research Letters* 2014; 41(19): 2014GL061665). Temperature profiles in the ocean vary at various global locations. The Gulf of Mexico tends to be a few degrees warmer than the North Sea so the depth needed to rapidly form MCH must be greater in the case of the former for a comparable temperature range. Some additional things to add here is that natural gas is considered an undesirable component to deal with when exploring deep ocean petroleum reserves. Stranded gas is sometimes flared or pumped back into the ground in order to prevent flaring the gas. The gas content is one criteria for selecting which reserves to produce and too high a gas contact can preclude development.

Natural gas is considered an undesirable component to deal with when exploring deep ocean petroleum reserves. Stranded gas is sometimes flared or pumped back into the ground. The gas content is one criteria for selecting which reserves to produce and too high a gas content can preclude development. There are earlier and ongoing efforts towards converting natural gas to hydrates in plants on land and on the sea surface. (See, e.g. Nakai, "Development of Natural Gas Hydrate (NGH) Supply Chain," World Gas Conference 2012, Kuala Lampur; Rehder et al., *Energies* 2012; 5(7): 2499-2523). The exothermic nature of the conversion process and the requirement for high pressure and temperature make the process hazardous, complicated and expensive. It is desirable to provide safe and effective methods for converting natural gas (mostly methane) to solid clathrate hydrates (fire ice) by performing the processing deep in the ocean where the in situ conditions (i.e., the hydrostatic pressure is high and water is cold) is conducive to the formation of clathrates. Doing so would, in turn, provide efficient and environmentally friendly ways of obtaining natural gas from underwater environments and safely transporting it for consumption. Further, because of the exothermic nature of the conversion process, the heat released from the process provides an added valuable resource for exploring deep ocean reserves of natural gas clathrates.

SUMMARY OF THE INVENTION

In a first aspect, the invention provides methods for extracting stranded gas from reservoirs in subterranean environments such as deep under the ocean floor. The stranded gas may be natural gas or hydrogen, and the gas may be present in or stored in a reservoir. The reservoir may be gas, or a mixture of oil and gas, or the reservoir may be natural gas stored as a natural gas clathrate hydrate. The methods feature an optional first step of drilling a well into the ocean floor to reach the stranded gas. In some instances, depending upon the reservoir, the well may yield only the stranded gas such as natural gas, hydrogen or other stranded gas. In other instances, the well may yield a mix of stranded gas such as natural gas and oil. In the case of a gas-oil mix, the methods feature a second step of separating the oil and the gas phases. This separating step may be performed, for instance, in a separator. It yet other instances, the stranded gas may exist in the form of a clathrate hydrate. In such instances, the second step may include destroying the original clathrate hydrate to gas and water via e.g. the applications of heat or/and lowering the pressure. The methods may feature a third step of transporting, pumping or piping the oil component to the ocean surface where the oil component may be processed according to known methods. Similarly, the third step may feature collecting the oil component into separate shipping containers for transport to the surface. The methods may feature a fourth step of cleaning the stranded gas such as natural gas of debris. The methods may feature a fifth step of transporting, pumping or piping the stranded gas such as natural gas into a gas/clathrate hydrate processing facility, such as one proximate on the ocean floor. The gas/clathrate hydrate processing facility may be designed to transform the stranded gas such as natural gas so that it forms solid hydrates such as clathrates. As a sixth step, such solid hydrates such as clathrates may be assembled and placed into shipping containers suitable for transporting the solid hydrates such as clathrates to the ocean surface. In some instances, the solid hydrates such as clathrates are first assembled and placed into shipping containers that are then emptied at the ocean surface into a larger transport carrier for transport to a destination for conversion back to natural gas or re-gasification. In other instances, the solid hydrates such as clathrates are assembled and placed into shipping containers, and these shipping containers are themselves used to transport the solid hydrates such as clathrates to a destination for conversion back to natural gas or re-gasification.

In a second aspect, the invention provides methods for extracting natural gas from reserves of natural gas hydrates in subterranean environments such as deep under the ocean floor. The methods feature an optional first step of drilling a well into the ocean floor to extract the hydrocarbons. In some instances, depending upon the hydrocarbon makeup of the reservoir, the well may yield natural gas only. The methods may feature a second step of cleaning the natural gas of debris. The methods may feature a third step of transporting, pumping or piping the natural gas into a gas/clathrate hydrate processing facility, such as one proximate on the ocean floor. The gas/clathrate hydrate processing facility may be designed to transform the natural gas so that it forms solid hydrates such as clathrate hydrate. Heat generated from this exothermic process of transforming the natural gas so that it forms solid hydrates such as clathrates may optionally be conducted or convected back to the source of the natural gas and subsequently used to facilitate liberating additional natural gas. As a fourth step, such solid hydrates such as clathrates may be assembled and placed into shipping containers suitable for transporting the solid hydrates such as clathrates to the ocean surface. In some instances, the solid hydrates such as clathrates are first assembled and placed into shipping containers that are then emptied at the ocean surface into a larger transport carrier for transport to a destination for conversion back to natural gas. In other instances, the solid hydrates such as clathrates are assembled and placed into shipping containers, and these shipping containers are themselves used to transport the solid hydrates such as clathrates to a destination for conversion back to natural gas.

In a third aspect, the invention provides a method for extracting natural gas or a mixture of oil and natural gas from a subterranean environment such as beneath the ocean floor and converting it into a solid hydrate such as a clathrate comprising:

a) extracting natural gas or a mixture of oil and natural gas;
b) optionally separating the natural gas from the mixture of oil and natural gas in a first tank or vessel;
c) transporting the natural gas to a second tank or vessel;
d) introducing sea water into the second tank or vessel;
e) mixing the natural gas and water to form a NGCH/water slurry;
f) removing excess water from the NGCH slurry to form a solid comprising a clathrate; and
g) processing the solid comprising a clathrate into a transportable form.

The method may further feature h) agitating or applying a pressure wave to the solid comprising a clathrate to promote additional growth of clathrate particles. The method may also feature aggregating smaller particles of NGCH and allowing them to naturally coalesce to form a large block.

The method may further feature i) shaping the solid comprising a clathrate into substantially tubular forms, and the method may also feature j) placing the solid comprising a clathrate that may be in substantially tubular forms into a vessel such as a bag suitable for transport to the surface of the ocean.

The mixing the natural gas and water to form a NGCH/water slurry may feature one or more methods including (i) spraying of a mist of water into a pocket of gas at the top of the tank or vessel that may include using water pumped up from the tank or vessel bottom, which may be optionally cooled by pumping it through outboard heat exchangers immersed in surrounding sea water, and using fresh sea water that is drawn in as the volume of gas is consumed and the pressure drops; (ii) drawing natural gas from a gas pocket at the top and pumping it to the tank or vessel bottom where it may be injected as fine bubbles that rise through the water in the tank or vessel. Along the way, clathrate hydrate may form as outer shells around gas bubbles as they float back up to the tank or vessel top forming a layer of NGHC/gas/water slurry below the gas pocket. The mixing may also feature (iii) stirring and shearing the slurry that accumulates below the pocket of gas, in order to break up the clathrate hydrate shells that form around gas bubbles. The mixing may also feature (iv) pumping a mix of gas and sea water taken from within the tank or vessel into the center of two solid and closely spaced, counter-rotating plates with corrugated surfaces, in order to provide a high shear field and locally pulsating pressure that also breaks up any clathrate slurry shells forming around ellipsoidal gas bubbles. The mixing may feature converting substantially all the natural gas to form a volume of slurry of NGHC and water at the top of the tank or vessel and warmed water at the tank or vessel bottom.

The amount of water may be selected such that the heat capacity and cooling rate of the excess water (i.e., water that is not consumed in forming the clathrate) and is sufficient to limit the temperature increase arising from the enthalpy of clathrate formation in a reasonable timeframe. The ambient water temperature may be around 2, 3, 4, 5 or 6 or 7° C., and the temperature rise may be kept small enough to maintain the overall system temperature below the stability temperature of the NGCH at 800 m depth (8.2 MPa), which may be of order 17° C. In general, the more water selected then the less temperature rise of the water but the more gas lost through absorbed gas in the water that is expelled.

The removing excess water from the NGCH slurry to form a solid comprising a clathrate may take advantage of the property that the less dense clathrate will float to the top.

The removing excess water from the NGCH slurry to form a solid comprising a clathrate may feature pumping or transporting the clathrate slurry into a device or mechanism to remove excess water. The natural gas may be substantially converted to a clathrate hydrate of substantially elongated and flattened ellipsoidal bubbles. The processing the solid comprising a clathrate into a transportable form may feature forming solid NGCH disks. The vessel such as a bag may be a foldable, flexible bag that may be expanded.

In a fourth aspect, the invention provides a system for extracting natural gas or a mixture of oil and natural gas from a subterranean environment such as beneath the ocean floor and converting it into a solid hydrate such as a clathrate comprising:
  a) a first tank or vessel designed to function as a gas/oil separator;
  b) a second tank or vessel designed to function as a NGCH processor; and
  c) a third tank or vessel adapted to function as a NGCH Collection/Shipping container.

The system may optionally comprise d) a well-head entry, and the system may optionally comprise e) a turbine/flow restrictor that may be coupled to a flow restrictor. a first tank or vessel designed to function as a gas/oil separator. The turbine may be attached to the exit of the well head to generate mechanical and electrical power to run electric motors and mechanical processing devices.

The first tank or vessel designed to function as a gas/oil separator having an internal pressure of about one to two bar above the ambient pressure of the sea water. The separator may operate as a centrifuge with the heavier (primarily oil) particles physically separated from the lighter (primarily gas) particles. The heavier particles aggregate at the outer layer and can be removed through an exit point positioned accordingly. An exit near the center may be where the lighter gas particles are removed.

The second tank or vessel designed to function as a NGCH processor may be a low pressure version (about 0.2 MPa or 2 bar) or a high pressure version (at least about 3.5 MPa or about 35 bar). Additionally the second tank or vessel may be designed to operate as a batch process. In some instances there may be multiple (e.g. 3) smaller batch processing tanks or vessels, Tank 2a, Tank 2b, Tank 2c, etc. staggered in time to act as a semi-continuous process. The second tank or vessel may be a cylindrical tank having a vertically oriented axis and a height to diameter ratio of about 5:2. The second tank or vessel may be semi flexible and may feature a valved top inlet and/or a bottom outlet and one or more temperature and/or pressure sensors and one or more apparatuses adapted for stirring.

The third tank or vessel adapted to function as a NGCH Collection/Shipping Container may be a collapsible bag or a foldable, flexible bag that may be expanded. It may be nearly neutrally buoyant, with a density nearly equal to that of water.

DETAILED DESCRIPTION OF THE PREFERRED EMBODIMENTS

Figure 1:
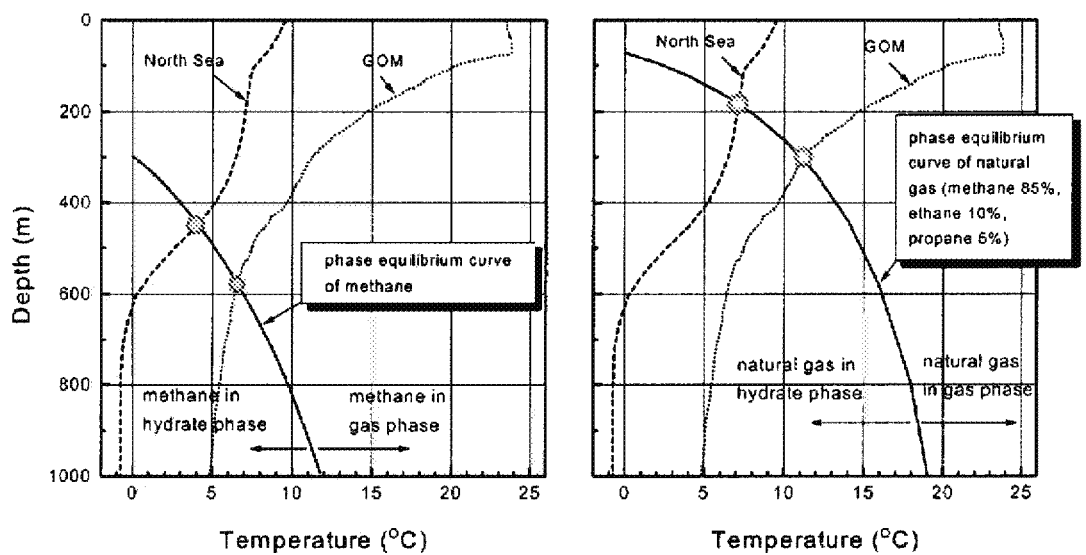
FIG. 1 provides the phase equilibrium curves (boundaries) for the formation of clathrate hydrates from methane as well as natural gas in terms of ocean depth (proportional to pressure) and water temperature. Also shown are temperature isoclines for the Gulf of Mexico and the North Sea.
Figure 2:
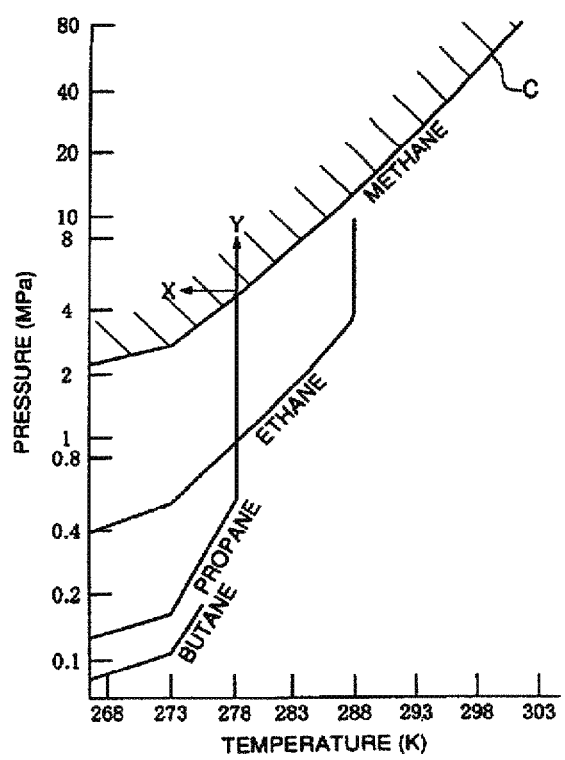
FIG. 2 provides phase equilibrium curves (boundaries) for the formation of clathrate hydrates from pure methane, pure ethane, pure propane and pure butane.

The present methods and systems feature the following elements and steps.
Process Design Steps Based on a Three-Tank System:
  Well-Head Entry.

Natural Gas or an oil/gas mixture rises up a drill pipe from an underground reservoir many hundreds or even thousands of feet below the sea floor, and comes to the well head. The gas/oil mixture may be mostly liquid at the original reservoir depth where the pressure can be up to 70 MPa and temperature around 115° C. (these being the conditions in the oil reservoir supplying the Macondo well). However at the point of entry to the well head, and depending on any subsequent flow restrictor and the actual flow rate, the pressure may be lower at, perhaps 20 to 30 MPa but the temperature will be close to 90° C., being lower than in the reservoir because of the boiling and adiabatic expansion of the gas out of the oil as the pressure decreases while traveling up the undersea pipe.

Turbine/Flow Restrictor.

Coupled to a flow restrictor a turbine may be attached to the exit of the well head to generate mechanical and electrical power to run electric motors and mechanical processing devices. At the flow rates and under the conditions described it will be possible to generate several hundred horsepower (⅓ megawatt or more). Upon exiting the turbine/flow restrictor, the pressure of the gas/oil flow will be the sea floor pressure of about 8.2 MPa, and the temperature still around 80° C. as more dissolved gas components boil out of the warm oil now at lower pressure.

Tank 1 Gas/Oil Separator.

Upon exiting the turbine/flow restrictor the gas/oil mixture enters Tank 1, a gas-oil separator, which may be essentially a tall vertical tank of length to diameter ratio of 4/1 and with an internal pressure of about one to two bar above the ambient pressure of the sea water. Such gas/oil separators are known and standard in the industry. A commercial oil/gas separator may be used to separate the two phases. The mixture may act as a centrifuge such that the heavier oil particles will migrate to the outside and the lighter gas particles will move towards the center. The entry point for oil/gas mixture is the middle of the separator unit. At the center of the separator is an exit pipe to pump out the natural gas component and divert it to the clathrate hydrate processing tank. Near the edge of the tank is an exit pipe to pump out the oil. The oil will be pumped into a pipeline that takes the oil to a receiving ship on the ocean surface. Alternately, the oil can be pumped to a DSM Dyneema or Spectra pressure vessel for subsequent transport. This tank can be made of a composite wound from UHMWPE fiber in a polyurethane matrix. DSM Dyneema UD tape can be used for this purpose. Thus, the tank itself will be neutrally buoyant and easily movable within the ocean using a remotely operated vehicle (ROV) or a suitable conveyor belt system to take tanks empty from the surface and full back to the surface. The required size of the tank depends on the residence time required for the gas to boil out, bubble up and fully separate from the oil. For a nominal base configuration, the gas flow alone will be about 546 m³/hr, and the gas and oil flow together perhaps 800 m³/hr. Assuming an effective 15 minute residency in the separator, the required volume would be about $V_{sep} \approx 200$ m³. The volume of such a 4/1 aspect ratio tank given diameter, $D_{sep}$, is $V_{sep} = \pi D_{sep}^m$, which yields $D_{sep} \approx 4.0$ m. The buoyancy forces for this tank would mainly be from natural gas volume, $V_{ng} \approx 200$ m³, so $F_{gas}$ $(\rho_w - \rho_{ng})gV_{ng} \approx 9319 V_{ng} = 1.27$ MN or about 286,000 lbf.

Tank 1 Details:
high buoyancy forces necessitate tank placement above the wellhead and attachment substantial structure (depend on the placement of other system components yielding buoyancy forces) in order to create a net axial force aligned with the well-head and pipe below, with minimal bending moments;
it will be necessary to have an enclosing strap system wrapped over the top and attached at bottom to a structure connected to the well head;
internal pressure varies somewhat with vertical position in the tank, depending on the vertical gas distribution, and wall axial and hoop tension (biaxial loads) will tend to be largest approaching the top, so the wall tank wall thickness may need to be thicker there particularly approaching the dome area;
the tank bottom should have an axisymmetric 'W' cross-section, with the gas/oil mix entering at the center high point, and any sediment or entering water falling into the ring at the 'W' low point where it can collected be and be pumped out.

Tank 2, NGCH Processor.

Once separated from the oil, the natural gas is pumped to Tank 2 through a gas line under a low relative pressure (for instance, 1 to 2 bar.) and which is fitted with a flow meter and control valve to meter a precise amount. Tank 2 has two potential versions: a low pressure version (no more than 0.2 MPa or 2 bar), and high pressure version (at least 3.5 MPa or 35 bar). Additionally Tank 2 may be designed to operate as a batch process. In fact it may be desirable to have multiple (e.g. 3) smaller batch processing tanks, Tank 2a, Tank 2b, Tank 2c, etc. staggered in time to act as a semi-continuous process. This would reduce the buoyancy forces of the gas separator tank that might act as a holding tank to store gas in between tank fills.

Considering first the low pressure version, Tank 2 will be a cylindrical tank with a vertically oriented axis and a height to diameter ratio in the range of 2 to 4, or so. The tank will be semi flexible and may be wound from Dyneema fiber/urethane UD tape. The tank is initially filled with cold sea water and as the natural gas is introduced through a valved top inlet, it fills the upper part of the tank and water is ejected out the bottom until a desired volumetric ratio of gas to water is achieved; around 3 parts water to 1 part gas, although this is adjustable. Once the desired volume ratio of water to gas is established, the tank is then semi-closed off from the outside environment using a one-way valve whereby more cold sea-water can enter if the tank pressure drops below the ambient sea water pressure and becomes at risk of implosion.

Figure 5:
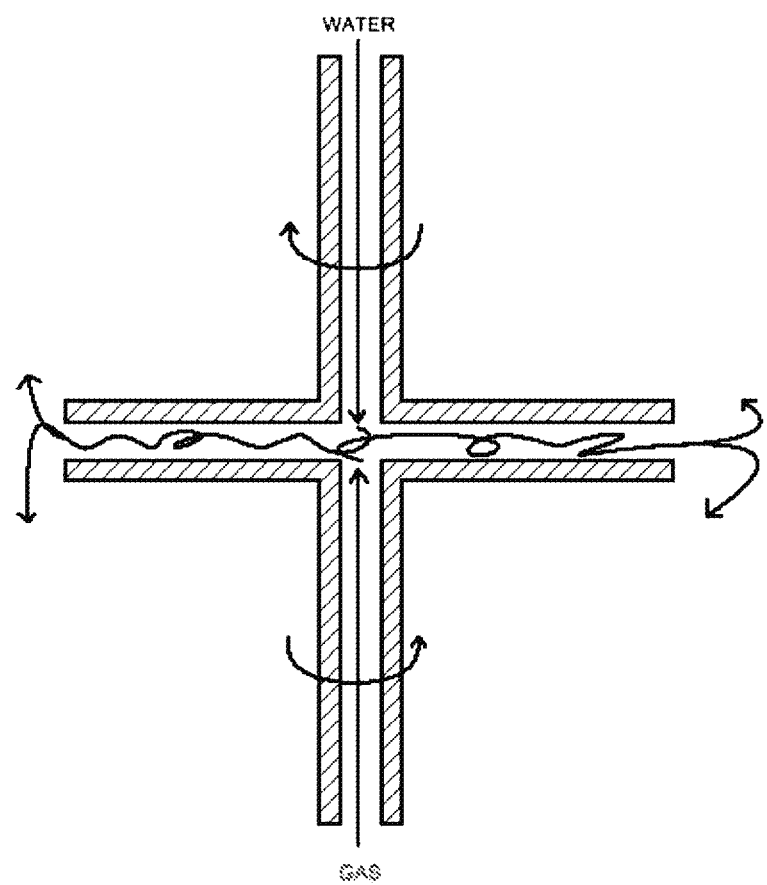
FIG. 5 demonstrates counter-rotating shear plates to break up the clathrate shells forming around gas bubbles.

The water and gas may then be mixed to develop a NGCH/water slurry using various methods: (i) spraying of a fine mist of water into the pocket of gas at the top of the tank both using water pumped up from the tank bottom, which may be cooled by pumping it through outboard heat exchangers immersed in surrounding sea water, and using fresh sea water that is drawn in as the volume of gas is consumed and the pressure drops; (ii) drawing natural gas from the gas pocket at the top and pumping it to the tank bottom where it is injected as fine bubbles that rise through the water in the tank, and along the way, from clathrate hydrate outer shells around them as they float back up to the tank top forming a layer of NGHC/gas/water slurry below the gas pocket; (iii) aggressively stirring and shearing this slurry that accumulates below the pocket of gas, in order to break up the clathrate hydrate shells that form around gas bubbles, (iv) pumping a mix of gas and sea water taken from within the tank into the center of two solid and closely spaced, counter-rotating plates with corrugated surfaces, in order to provide a high shear field and locally pulsating pressure that also breaks up any clathrate slurry shells forming around ellipsoidal gas bubbles (FIG. 5). Eventually all the gas is converted to form a volume of slurry of NGHC and water at the top of the tank and somewhat larger and warmed water volume at the tank bottom, which also contains a small amount of dissolved natural gas in solution.

An important aspect is the determination of the initial gas to water ratio in the tank before pressurizing and stirring. The amount of water is selected such that the heat capacity and cooling rate of the excess water (i.e., water that is not consumed in forming the clathrate) and is sufficient to limit the temperature increase arising from the enthalpy of clathrate formation in a reasonable timeframe. The excess of water is also used as a sink for salt brine expelled during the formation of clathrate hydrate crystals. Typically the ambient water temperature will be around 5° C. and the temperature rise must be kept small enough to maintain the overall system temperature below the stability temperature of the NGCH at 800 m depth (8.2 MPa), which may be of order 17° C.

The final processing step is to squeeze out the residual excess salty water from the NGCH slurry to form a solid, and this is partly accomplished by the fact that the less dense clathrate will float to the top while salt rich brine tends to gather at the bottom of the tank. Nonetheless the enriched clathrate slurry must be pumped into a device or mechanism to squeeze or wring out excess water in order to form large solid NGCH disks. These disks will be round and of uniform thickness with a large diameter to thickness ratio, and which can be released and stacked in tall cylindrical shipping bags referred to as Tank 4, as described below. Additionally to facilitate later processing of the NGCH to recover natural gas, Dyneema or polyethylene spacers can be placed in between stacked NGCH disks so they do not fuse together. These can then be later broken up to increase the surface area to volume ratio, thus greatly increasing the NGCH 'dissociation' rate (See, e.g. Takeya et al., *Chem. Eng. Sci.* 2005; 60(5):1383-1387; Falenty et al., *Energy Fuels* 2014; 28(10):6275-6283). This appears to be less desirable perhaps than pursuing the formation of NGCH solid cylinders of 1 meter diameter and 4 meters length and to pack those efficiently in the shipping container. This would require special compressive squeeze or auger driven thick-wall Dyneema based cylinders to process the NGCH into cylinders.

Considering next the high pressure version (more than 3.5 MPa relative to ambient sea water of 8.2 MPa), Tank 2 may also be a much thicker than the low pressure version, UD tape-wound cylindrical tank with a vertically oriented axis and a height to diameter ratio of about 5/2. The tank may be initially filled with cold sea water and as the natural gas is introduced through a valved top inlet, as it fills the upper part of the tank and water is ejected out the bottom until a desired volumetric ratio of gas to water is achieved of about 2 parts water to 1 part gas or less, so lower than for the low pressure system. Once the desired volume ratio of water to gas is established, the tank is then semi-closed off from the outside environment using a one-way valve and pressurized to the desired high pressure by pumping in under pressure more cold sea-water to compress the gas. The absolute internal pressure is now close to 12 MPa, equivalent to an ocean depth of 1200 meters.

Tank 2 Details:
  must manage temperature and pressure for optimal reaction in a reasonable timeframe;
  water is used as both a non-stoichiometric quantity reacting with natural gas to form clathrate hydrate, as well as an in situ heat sink to keep temperature below critical clathrate stability temperature at the operating tank pressure;
  must introduce exactly the correct water to gas ratio before and during pressurization and subsequent mixing, and depending on the ability to cool water during processing through heat exchangers;
  the processing container volume depends on how many containers are used in a staggered rotation, which in turn depends on how fast natural gas can be converted to NGCH;
  once the NGCH formation process is near completion for a certain amount of injected natural gas and most of the gas is consumed, it may be advantageous to run a $2^{nd}$ (and even $3^{rd}$ and $4^{th}$ cycle) of injection whereby more gas is injected at the top and perhaps some amount of warmed water removed from bottom to make room;
  the process would require precise temperature and pressure sensors to monitor reaction;
  high buoyancy forces will be associated with the Tank 2 reactor as they were with the Tank 1 separator, so a similar tie down strap system will be needed to hold the tank in place. (Note that force sensors in the tie-down strap system can tell us how much natural gas remains in the container at any point still to be reacted).

Tank 3, NGCH Collection/Shipping Container.

The amount of solid NGCH that is produced may be, for instance, about 300 m³/hr, or 7,200 m³/day. Assuming a foldable, flexible bag that can be expanded, assuming a length to diameter ratio L/D=4, the volume in terms of diameter given as V=πD³ so that $$D = \sqrt[3]{V/\pi}.$$

Thus if one bag is filled every 4 hours, the volume of NGCH is V=1,200 m³ and diameter is $$D = \sqrt[3]{1200/\pi} \approx 7.3 \text{ m}$$

and length is L≈29.2 m. For a bag filled every six hours the volume is V=1,800 m³, and the dimensions are D≈8.3 m and L≈33.2 m. Thus if such a bag is to be filled with NGCH disks stacked on top of each other, their diameter must be at least 7 meters. On the other hand ordered regular packing of smaller NGCH solid cylinders or square cross-section prisms would be a possible approach as follows.

Clathrate Processing into Solid Cylinders.

The NGCH slurry may be compressed into solid cylinders of length to diameter ratio of, for instance, about 4. In this case the volume of the cylinder is V=πD³, Considering a flow of 300 m³/hr of solid NGCH, it is useful to consider how many solid cylinders would need to be processed per hour and of what size. For instance, if the diameter of a solid cylinder is 1 m, its length is 4 m, and its volume would be 3.14 m³. Thus 100 such cylinders might be processed per hour or one every 36 seconds. This may be performed using a thick-walled Dyneema cylinder to sustain very high axial and hoop stresses and with a screw-driven press or auger of some sort. Several may be run in parallel, and in fact make cylinders of different diameter to facilitate efficient packing.

Figure 6:
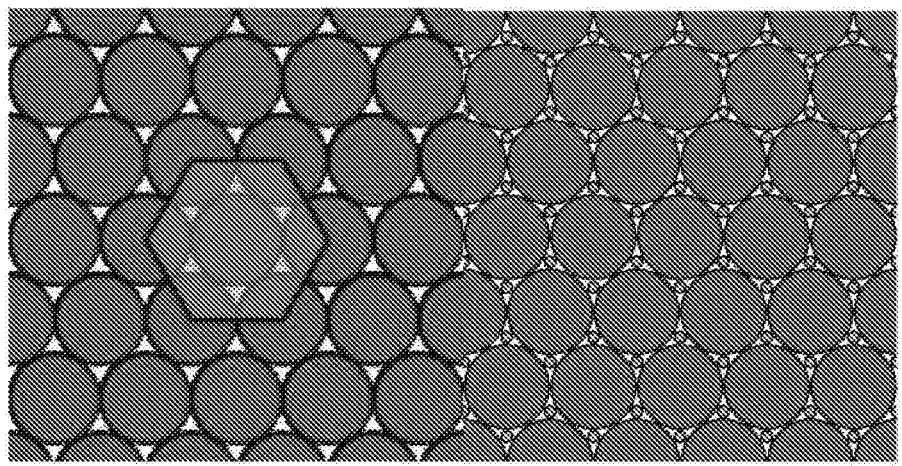
FIG. 6 depicts hexagonal packing of round cylinders: one size on left with packing density 0.9069; two sizes of diameter ratio 0.1547 on right with packing density 0.9503 after Kennedy in Discrete and Computational Geometry 35 (2006), 255-267.

Consider filling a bag of diameter of roughly 7 meters, with cylinders of 1 meter diameter packed hexagonally in a cross-section (FIG. 6) and axially aligned in the bag end-to-end. If the outside of the bag has the shape of a hexagon, the across a diagonal there would be 7 cylinders and 37 cylinders would occupy a cross-section. With a solid cylinder length of 4 meters and bag length of about 27 meters. There would be 7 cylinders end to end. Also in this case the packing density turns out to be $\eta_{hex}=\pi/(2\sqrt{3})\approx0.9069$ so the total volume of NGCH at these dimensions would be 259 m³ so would fall somewhat short of 300 m³. For binary packing in FIG. 4, where small NGCH cylinders are packed between the larger ones with diameter ratio of diameter ratio 0.1547 (so the small cylinders are 15.5 cm in diameter) the packing density increases to 0.9503. Nonetheless one could fill the void space with partly compressed NGCH/water slurry.

Shipping Bag Buoyancy Force.

The buoyancy force in a 4 hour bag when full is given by $$F_{b,NGCH} = (\rho_W - \rho_{NGCH})gV =$$
$$(1025 - 900)9.81V = 1226V \text{ N} = 1226(1200) = 1.47 \text{ MN} = 330,000 \text{ lbf}$$

and for a six hour bag is $F_{b,NGCH}\approx2.21$ MN≈495,000 lbf. These buoyancy forces are of the same order of magnitude as for the gas/oil separator Tank 1 (286,000 lbf) and the processing Tank 2 (613,000 lbf). Thus, while filling the bag, a tie-down strap system may be needed similar to that for Tanks 1 and 2.

Bag Permeability and Insulation.

The walls of the NGCH container or bag may have some permeability and will have low thermal conductivity to prevent regasification (melting) of the clathrate hydrate as the water temperature increases and the hydrostatic pressure drops as the container is brought to the ocean surface. An insulating blanket/sock may or may not be built into the bag when it is deployed to the ocean floor. It may be preferable for the insulating blanket to be added when the NGCH cylinder reaches the surface as to avoid unmanageable bulk and buoyancy issues during filling at the ocean surface. NGCH is capable of developing a protective ice coating (See, e.g. Takeya et al., *Journal of Physical Chemistry* C 2012; 116(26):13842-13848) and thus entering into a self-preserved state (See, e.g. Stern et al., *Journal of Physical Chemistry B* 2001; 105(9):1756-1762) that effectively retards a further decomposition. Moreover, after developing this protective film, the large enthalpy of dissociation of NGCH (40% more per Kg than for melting of ice) means that it cannot easily dissociate without a continuous, large supply of heat, thus slowing the decomposition even further. Moreover, dissociation results in the liberation of free gas, which on the clathrate surface can act sacrificially as an insulator and under certain conditions also as stabilization of the structure if trapped.

System Buoyancy Force.

The maximum total buoyancy forces for all three tanks, as well as associated equipment, are likely to be as much as 1.3 million lbf or more, or 650 tons or 590 tonnes. This value may be reduced somewhat by filling smaller bags more frequently, but the main contributor to buoyancy is Tank 2. To place such loads in perspective, a load of 1.3 million lbf would be the sum of the breaking strengths of two 3-inch diameter steel ropes. Alternatively, for high strength steel rod say with a strength of 100,000 psi, one would require 13 in$^2$ of material so the diameter would be $D=2\sqrt{A/\pi}=4.1$ in. Clearly such loads would put major axial loading demands on the well head and pipes down to the reservoir if the system were attached to it, and will require careful placement of components to minimize bending loads. While filling the bag, buoyancy forces develop and need massive tie downs as in Tanks 1 and 2. Symmetry is needed—possibly multiple smaller bags and reactors arranged/balanced in near axisymmetric geometry. On the other hand for a pipe pressure of 6,000 psi on a closed blowout preventer, and a pipe diameter, D, the pipe diameter would need to be $D=\sqrt{4F_{b,total}/(\pi p)}=\sqrt{4\times1.3\times10^6/(\pi 6000)}=16.6$ in to restrain a blowout force of 1.3 million lbf.

General Description

The present invention converts stranded gas, typically natural gas (mostly methane) but possibly also hydrogen to solid clathrate hydrates (fire ice) by performing the processing deep in the ocean where hydrostatic pressure is high and water is cold; both of these conditions are necessary for clathrate hydrates to form.

The methods described herein feature a first step of drilling a well into the ocean floor to extract natural gas from hydrocarbon reservoirs (oil and gas) deep under the ocean floor. Depending on the hydrocarbon makeup coming from the reservoir, the well may yield gas only, or a mix of gas and oil. In the case of a gas-oil mix, the oil is separated from the gas at the ocean floor through a specially designed separator. The oil component is then piped to the ocean surface and processed in the usual fashion. The gas natural gas component is cleaned of debris and piped into a gas/clathrate hydrate processing facility on the ocean floor designed to form and place solid hydrates in large shipping containers for transporting to the ocean surface.

The pressure in the oil or gas in the exit pipe just below the ocean surface typically is much higher than the water pressure at the ocean floor. The gas expansion that occurs at the exit point from the sea floor, which may or may not involve a flow restrictor of some kind, provides a means for power generation (electric or mechanical) through a turbine.

The pressure in the oil or gas in the exit pipe just below the ocean surface typically is much higher than the water pressure at the ocean floor. The gas expansion that occurs at the exit point from the sea floor, which may or may not involve a flow restrictor of some kind, provides a means for power generation (electric or mechanical) through a turbine (potentially part of this patent).

The methods described herein provide a natural gas/oil separation process at the well head, the processing system of the resulting natural gas into solid NGCH, and the filling of shipping containers with solid NGCH for transport to the ocean surface. The system includes the overall processing system design and the materials used, as well as the transport container design and materials used.

Technical Issues in the Efficient and Rapid Formation of NGCH:

While the deep ocean appears to be an ideal environment to form and process MCH and NGCH, there are several technical issues to overcome in efficiently and continuously converting large quantities of such hydrocarbon gasses into large containers of solid clathrate. There are also issues in successfully transporting such containers from the ocean floor to the ocean surface where they must be able to maintain the stability of the NGCH for some time. That is, there should be no significant and premature decomposition of the NGCH into liquid water and natural gas that might escape into the atmosphere, and this must be done without any cumbersome cooling or pressurization systems attached to the containers.

There are also issues in actually transporting the containers of MCH and NGCH large distances to clathrate processing centers, which must be designed to decompose the clathrates into gas and largely salt free water. Apart from the natural gas recovered, which may be pumped into gas pipelines, the processing absorbs large amounts of heat from any surrounding water either in direct contact or in contact through heat exchangers. In fact, in such processing facilities are near large cities, there is an opportunity to cool buildings as the clathrate melts and absorbs heat. Furthermore the water recovered is largely salt free and a potentially a source of fresh water in areas where fresh water is less plentiful and even at a premium.

Upon mixing natural gas and water, the NGCH formation process is limited by the rate of heat absorption into the surrounding water. For instance, the enthalpy of formation of MCH from methane and water is 40% higher per kilogram than that of freezing water to ice (enthalpy of 441 kJ/kg for MCH formation vs 334 kJ/kg for freezing water into ice). To appreciate the significance of this fact, the amount of the heat released during formation of 1 kg of MCH is equivalent to the heat required to warm liquid water from just above freezing at 0° C. to the point of boiling at 100° C. This means that a large amount of cold water must be involved in the MCH formation process to absorb and conduct away the heat generated. If heat exchangers immersed in nearby ocean water are developed in connection with a closed NGCH processing container, high water flow rates and large surface areas for heat exchange must be developed for efficient transfer of the heat into the ocean water.

The speed with which methane or natural gas combines with water to form MCH or NGCH depends on the driving force for the reaction indirectly related to the difference in water pressure and temperature between the formation conditions and the thermodynamic stability boundary. FIG. 1 shows phase equilibria profiles in the ocean (temperature vs pressure curves). The regions to the left of these curves reflect conditions that allow hydrate clathrate formation and, to the right, will not. These curved lines represent transition temperatures. For instance, at 800 meters depth in the ocean, methane will combine with water to form MCH at temperatures less than 9° C. (48° F.), whereas in the case of natural gas, the transition temperature for NGCH formation is beneficially higher at about 18° C. (64° F.). At the same time, for a given transition temperature of 9° C. (48° F.) to form MCH and NGCH, the formation of NGCH requires less ocean depth of only 300 meters, not 800 meters for MCH. Since there is more 'headroom' for the warming of the local water around the forming sites of solid clathrate hydrate particles that is available to absorb the heat (enthalpy) of clathrate formation.

Research shows that the heat transfer rate and gas transport rate through solid MCH is slow (See, e.g. Kuhs et al., *Journal of Physical Chemistry B* 2006; 110(26):13283-13295; Shi et al., *Chem. Eng. J.* 2011; 171(3):1308-1316; Falenty et al., *Journal of Physical Chemistry C* 2013; 117(16):8443-8457), so MCH must first be formed as fine spheres or flakes (~1 mm in size) suspended in water. In fact, MCH tends to form as solid shells on the surface of a small gas bubble eventually trapping some gas within the shell (See, Warzinski, et al., *Geophysical Research Letters* 2014; 41(19):2014GL061665), and in quiescent or stagnant flows diffusion processes are required for the gas to pass through the shell wall to combine with the water on the outside. This is inherently a slow process. In order to speed the MCH formation process, these clathrate hydrate shells are continuously shattered and broken up as they form. Also, elongated and flattened ellipsoidal bubbles are preferable to spherical ones. Thus a high shear rate of the flow containing the gas water mix, for instance, through aggressive stirring, promotes such elongated shapes. A small amount of surfactant, such as sodium dodecyl sulfate (SDS), has a beneficial effect of reducing the size of gas bubbles, which greatly increases the surface area to volume ratio of the bubbles, and thus, greatly increases the MCH formation rate.

An intermediate step may feature the introduction of some quantity of natural gas and cold water, in some ratio, into a closed or semi-closed container under a certain internal pressure. As time goes on a slurry of NGCH and water will form together with the remaining gas, and in the process, the heat generated will cause the temperature of remaining available water to rise to the point where the system temperature reaches the phase equilibrium line in FIG. 1. Approaching that temperature, any further reaction of natural gas and water to form NGCH stalls. At this point, more cold water may be added to lower the temperature and through stirring and reinjection of the remaining natural gas into the slurry the clathrate formation process continues. Sufficient water may be added so that eventually all gas is either converted to clathrate (a large fraction) or dissolved in the water (a small fraction). The water may be squeezed out of the clathrate/water slurry by straining the slurry and then compressing it to squeeze out the water and ejecting it into the ocean. This extracted water becomes the means by which the heat is removed during the processing. Some amount of methane or natural gas may be dissolved into the water or dispersed in the form of nano-bubbles and may be therefore lost to the ocean, making the process somewhat less efficient. Depending on the pressure and temperature range available to the left of the transition (phase equilibrium) line in FIG. 1, the volume of water involved may be of the order of ten times the volume of solid NGCH formed, and as much as 15 percent of the natural gas may be dispersed or dissolved into the water and ejected into the ocean, lowering efficiency. Environmental concerns may also be raised, though at this depth this minute amount of lost gas is likely to be further diluted and consumed by microbes in the ocean and does not reach the ocean surface and atmosphere (See, Rehder et al., *Marine Chemistry* 2009; 114(1-2): 19-30.). It is preferable, therefore, to have less initial water, to remove it from the slurry once the temperature rises, to cool this water by pumping it through a closed heat exchanger immersed in ocean water, and then to re-inject this cooled water back into the clathrate hydrate formation process in the closed reaction container. Eventually when all the natural gas has formed NGCH, the residual liquid water can be squeezed out and injected into the ocean. In this way, the loss of dispersed and dissolved gas into the ocean water is kept to a minimum. Either way, conversion of a given amount of natural gas to solid NGCH, requires removal of all the heat generated and its dissipation into the ocean and squeezing out of unused water from the NGCH slurry to form a solid, which can then be placed in a shipping container.

A reaction vessel will be developed to carry out the NGCH processing, not only accounting for the issues described above, but also accommodating practically important gas flow rates from a typical well. In doing so relevant considerations include:

(i) There is a requirement to have power available to pump fluids in an out of heat exchangers and containers, to drive mechanisms that break up the clathrate hydrate shells surrounding gas bubbles in order to speed the conversion process, and, to squeeze the water out of the NLCH water slurry to form a solid;

(ii) There is a requirement to have one or more containers process the natural gas into solid NGCH and others to store it efficiently for transport to the ocean surface. The containers must be large and will generate large buoyancy forces depending on the rate at which methane or natural gas can be separated from the oil processed into a NGCH in the steady state. In short, the longer it takes on average to convert a liter of natural gas to roughly a liter of NGCH, the longer the buoyancy forces of that partially converted gas liter must be restrained.

Item (i) can be accommodated by installation of a gas turbine at the point of exit of the gas from the well head, since the pressure of the gas traveling up the pipe and just below the sea surface is much higher than the pressure environment at the sea floor, so the gas will expand significantly under a large pressure differential which can be tapped to create power. Item (ii) can be practically accomplished, particularly for NGCH transport containers, by making use of near neutrally buoyant, extremely strong, flexible fibrous materials. Such materials can even allow the development of collapsible containers that can be moved about easily by remotely operated underwater vehicles. Except possibly for smaller semi-permanently installed containers carrying out certain aspects of processing, these requirements essentially rule out the use of metal containers.

Gas Flow Rates and Process Requirements:

The blowout of the Macondo well in the Deepwater Horizon Disaster occurred at a depth of nearly 1500 meters in the Gulf of Mexico, and the volumetric flow rate of the gas component (mostly methane compressed under about 15 MPa at that depth) was 9.372 $m^3$/min or 562.32 $m^3$/hr. Under 15 MPa and 4° C. conditions, 0.877 liters of methane gas results in the formation of 1 liter of MCH. Thus the effective formation of solid MCH or NGCH, most of which formed within 15 to 100 meters above the blowout, was 10.69 $m^3$/min or 641.21 $m^3$/hr. This clathrate hydrate then drifted off in the ocean currents and ultimately melted as it rose towards the surface whereby virtually all the released natural gas dissolved into the sea water and was consumed by microbes. Of the total hydrocarbons (gas plus oil) exiting the well, the gas component by mass was about 25% of the total and by volume the gas component was 60%.

Figure 3:
FIG. 3 depicts the Shell Prelude Floating Liquid Natural Gas Processing Facility currently under construction.
Figure 3:
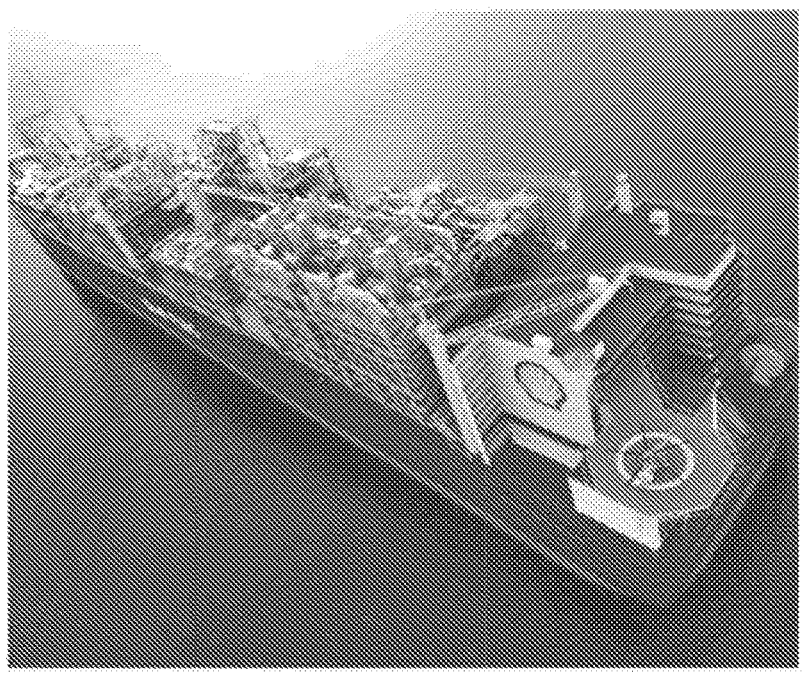

The natural gas flow component from the Macondo well was smaller but comparable to the proposed processing capability of the 488 meter long Shell Prelude Floating Liquid Natural Gas (FLNG) processing ship, which is being built. The proposed use is to float the ship above several gas wells and to process natural gas into liquid natural gas using massive cooling equipment to lower the gas temperature to −163° C. The extracted heat, comparable to the enthalpy per Kg of forming NGCH, would be expelled into the surrounding ocean (FIG. 3). Despite its size and cost, the proposed amount of natural gas in Kg, that the Prelude will process is actually only 5 times the amount of natural gas exiting the Macondo well blowout. For 'baseline calculations' assume a gas flow of half that from the Macondo well so 10% of that processed by the massive Shell Prelude FLNG.

Solid MCH, has a density of approximately $\rho_{MCH}=900$ kg/m$^3$ so at 1500 meters depth one compressed liter of methane gas yields approximately one kilogram of MCH. At the same time, the density of methane gas at this 15 MPa pressure and a close to 4° C. temperature is $\rho_{mg}=138$ kg/m$^3$, so about 15% as dense as the MCH it forms. At lesser depths and pressures the gas density is less and the gas volume needed to form a liter of MCH is proportionally more. One important issue is that because of its much lower density (gas density is about $\frac{1}{7}^{th}$ that of sea water at that depth), the buoyancy forces that would be generated during processing an amount of natural gas, similar to the Macondo well flow, are potentially very large.

Baseline Pressures and Gas Flow Rates for Design Calculations

In order to determine the overall process in terms of processing components, reaction speeds, container sizes and buoyancy forces, calculations were performed assuming a somewhat lesser effective gas flow rate and resulting MCH formation rate, than occurred uncontrolled in the Macondo well blowout. The flow rate may be controlled by flow restriction, as essentially occurred through the jammed and partially closed blowout preventer. (By some estimates a fully open blowout preventer below the severed pipe would have increased the flow rate moderately, by about 33%.) Thus assume the equivalent of 5.0 m$^3$/min or 300 m$^3$/hr, so a little more than half the gas flow component from the Macondo well under 15 MPa. At an MCH density of $\rho_{MCH}=900$ kg/m$^3$, which also applies to NGCH, this yields 4500 kg/min or 270,000 kg/hr of solid NGCH that must be placed in containers to transport to the ocean surface. The amount of natural gas considered in the baseline calculations is still about $\frac{1}{10}$ the processing capability of the multi-billion dollar, Shell Prelude FLNG ship, so still a substantial amount.

Assume a more modest depth of 800 meters or 8.24 MPa rather than 15 MPa of the Macondo well. At this pressure the natural gas will be larger in volume than at 15 MPa by the factor approximately 1.82, and thus, its density will be more like that of methane at this pressure, namely $\rho_{mg}=75$ kg/m$^3$. In fact, the natural gas would likely have more ethane and propane and could be slightly denser. Thus it will take (0.877)(1.82)=1.6 liters of gas to produce 1 litre or 0.90 Kg of NGCH. Designing for these conditions would allow for a broader range of ocean depths at which the system could potentially operate. Calculations regarding process and containment constraints were performed.

Process Container Calculations

Suppose a reaction chamber is built to process 300 m$^3$/hr of NGCH, which would require 546 m$^3$/hr of gas at 8.24 MPa and temperature say 4° C. (Multiple reaction chambers would be proportionally smaller in size.) Irrespective of ocean depth of the processing facility, the heat generated per hour in forming NGCH is about (441 kJ/kg)×(270,000 kg/hr)=1.19×10$^8$ kJ/hr, or 1.99×10$^6$ kJ/min, or 3.31×10$^7$ J/sec. (Note that this is equivalent of 33.1 megawatts or 44,400 hp, which gives some idea of the cooling potential of city buildings that is possible from the enthalpy involved in converting NGCH back to natural gas at the processing location next to a city). Suppose the temperature differential for extracting heat is 10° C. (See FIG. 1 and assume a depth of 800 m and a mix of methane, ethane and butane typical of natural gas. Extraction of this amount of heat corresponds to heating 2,700,000 kg per hour of sea water approximately 10° C. Viewing this a different way, if no heat exchanger for water cooling is used, then 10 times the mass of sea-water must be involved in heat absorption from clathrate formation as the mass of clathrate actually formed.

Suppose all the continuously flowing natural gas is to be converted in the container to NGCH under the following conditions: (i) an effective half hour gas residency occurs in a semi-closed container (which means the container will always have a gas volume equal to half of one hour of gas flow entering the system), and (ii) sufficient water is supplied coming in and going out to maintain the exchange of heat, and (iii) on average NGCH is in the container equivalent to the conversion of half of the inflowing gas per hour, and (iv) 10 times as much water as NGCH must be in the container at any given time and flowing through to remove the heat. Under these conditions, the container would need to have a volume of roughly 2000 m$^3$, most of which is occupied by sea water absorbing to conduct away the generated. To put this in perspective, one would need a cylindrical container about 10 meters in diameter and 25 meters long. To reduce the size of the container, one would need to continuously extract the warmed water, pump out and cool the water to near 800 m deep sea temperature using external heat exchangers, and then pump the water back into the changer where it remixes with the gas an NGCH/water slurry. If this were done so that only $\frac{1}{5}$ of the amount of water is needed in residency per hour, then the container volume could be reduced to perhaps 700 m$^3$ to process into NGCH the flowing natural gas. This would require a considerably smaller cylindrical container of roughly 7 m diameter by 18 m in length. Additionally, the recycled water would beneficially have methane in solution in a saturated state aiding the process, and reducing the losses resulting from pumping in fresh cold sea water and allowing the warmed water with significant dissolved natural methane gas to escape.

Large buoyancy forces must be dealt with. These buoyancy forces are driven mainly by the gas in the system at any given time and to a lesser extent the MCH in the system. Assuming a volume $V_{c,mg}$ of methane gas and corresponding densities of water and methane gas at 800 meters depth, the buoyancy force of gas alone is $$F_{c,b,mg} = (\rho_w - \rho_{mg})gV_{c,mg} = (1025 - 75)9.81V_{c,mg} =$$
$$9319V_{c,mg} = 9319(273) = 2,544,224N = 571,735 \text{ lbf}$$

For the volume, $V_{c,MCH}$, of MCH in process chamber residency at any time we have the buoyancy force of the MCH in the chamber as $$F_{c,b,MCH} = (\rho_w - \rho_{MCH})gV_{c,MCH} = (1025 - 900)9.81V_{c,MCH} =$$
$$1226V_{c,MCH}N = 1226(150) = 183,900N = 41,342 \text{ lbf}$$

The sum of the two is forces about 613,000 lbf, which gives some idea of buoyancy force of the processing container that needs to be restrained.

A Container that Sustains Significant Additional Process Pressure

It is possible with supplemental pressure support to operate more efficiently at 800 m depth—or even operate at lesser depths provided cold water near 0° C. is available. A composite overwrapped pressure vessel acting as a reactor for clathrate processing may be developed which operates at a delta pressure of, for instance, 3.5 MPa (~500 psi) equivalent to an additional 340 meters depth. Scaling in size from the NASA NORS T-1000 carbon/epoxy pressure vessel (20 inches diameter, 1 inch thick overwrap wall) provides an indication of what would be required. This tank had a 27,000 psi (186 MPa) burst strength and we assume operating pressure of half that pressure 13,500 psi (SF=2). At 500 psi, the NORS vessel diameter scales to 20"×0.0254×13,500/500=13.7 meters. For a length to diameter ratio of 5/2, this would result potentially in a 4000 m³ tank. The wall thickness could be reduced to perhaps 0.6 inches. This gives some idea of the potential of a pressurized system.

Figure 4:
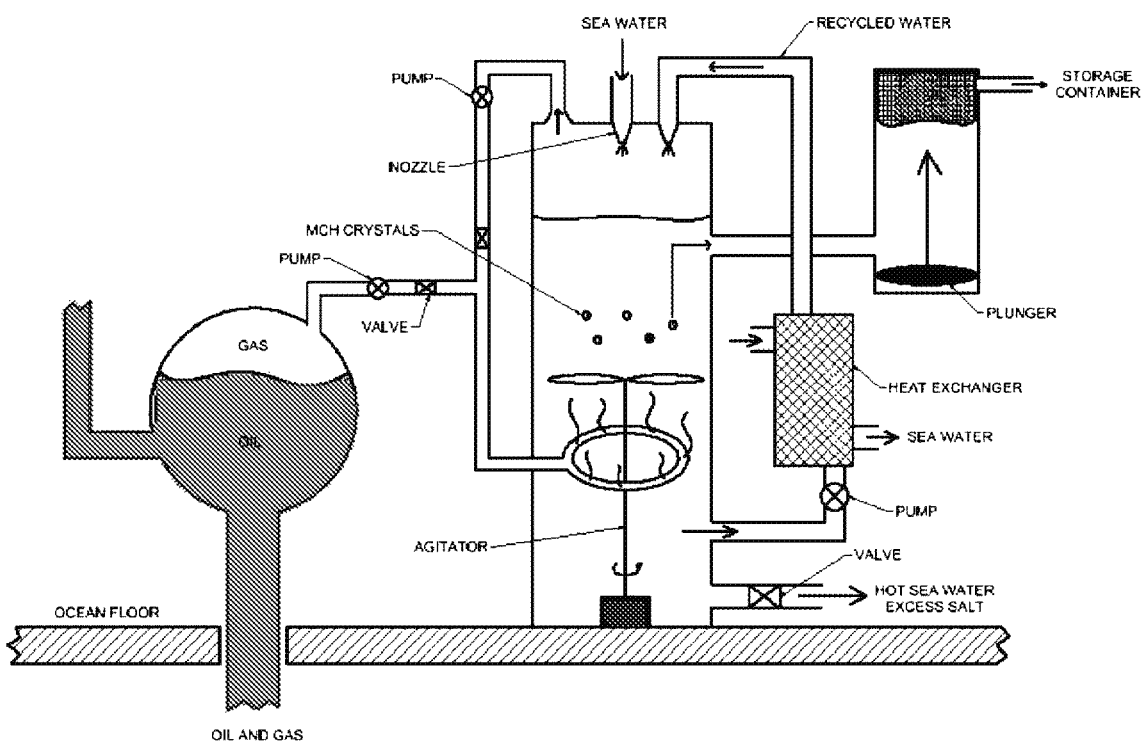
FIG. 4 provides a basic schematic of invention.

A schematic of the basic design is shown in FIG. 4.

We claim:

1. A method for extracting natural gas from a hydrocarbon reservoir of oil and gas in a subterranean environment comprising the steps of
    (a) optionally drilling a well into the ocean floor to extract hydrocarbons as a natural gas or oil and natural gas mixture;
    (b) extracting hydrocarbons as a natural gas or oil and natural gas mixture;
    (c) separating oil from the natural gas in a separator;
    (d) optionally transporting, pumping or piping the oil to the ocean surface;
    (e) cleaning the natural gas of debris;
    (f) transporting, pumping or piping the natural gas into a subsea gas/clathrate hydrate processing facility;
    (g) transforming the natural gas so that it forms solid hydrates; and
    (h) assembling the solid hydrates into a shipping container suitable for transporting the solid hydrates to the ocean surface.

2. The method of claim 1 further comprising i) emptying the shipping container at the ocean surface into a larger transport carrier for transport to a destination for conversion back to natural gas.

3. The method of claim 1 further comprising i) transporting the shipping container containing the solid hydrates to a destination for conversion back to natural gas.

4. A method for extracting natural gas from a reserve of natural gas hydrates in a subterranean environment comprising:
    (a) optionally drilling a well into the ocean floor to extract hydrocarbons as a natural gas;
    (b) cleaning the natural gas of debris;
    (c) transporting, pumping or piping the natural gas into a subsea gas/clathrate hydrate processing facility;
    (d) transforming the natural gas so that it forms solid hydrates; and
    (e) assembling the solid hydrates into a shipping container suitable for transporting the solid hydrates to the ocean surface.

5. The method of claim 4 further comprising f) conducting heat generated from the method of claim 4 back to the reserve of natural gas hydrates.

6. A method for extracting natural gas or a mixture of oil and natural gas from a subterranean environment and converting it into a solid hydrate comprising:
    a) extracting natural gas or a mixture of oil and natural gas;
    b) separating the natural gas from the mixture of oil and natural gas in a first tank or vessel when a mixture of oil and natural gas is extracted;
    c) transporting the natural gas to a subsea second tank or vessel;
    d) introducing water into the subsea second tank or vessel;
    e) mixing the natural gas and water to form a NGCH/water slurry;
    f) removing excess water from the NGCH/water slurry to form a solid comprising a clathrate; and
    g) processing the solid comprising a clathrate into a transportable form.

7. The method according to claim 6 further comprising h) agitating or applying a pressure wave to the solid comprising a clathrate to promote additional growth of clathrate particles.

8. The method according to claim 6 further comprising h) shaping the solid comprising a clathrate into substantially tubular forms.

9. The method according to claim 6 further comprising i) placing the solid comprising a clathrate into a vessel suitable for transport to the surface of the ocean.

10. The method according to claim 6 wherein the mixing the natural gas and water to form a NGCH/water slurry comprises one or more methods selected from the group consisting of (i) spraying of a mist of water into a pocket of gas at the top of the subsea second tank or vessel, (ii) drawing natural gas from a gas pocket at the top of the subsea second tank or vessel and pumping it to the subsea second tank or vessel bottom where it is injected as bubbles that rise through the water in the subsea second tank or vessel, (iii) stirring and shearing the NGCH/water slurry that accumulates below a pocket of gas in order to break up the clathrate hydrate shells that form around gas bubbles, and (iv) pumping a mixture of gas and water taken from within the subsea second tank or vessel into the center of two solid and spaced, counter-rotating plates with corrugated surfaces, in order to provide a shear field and locally pulsating pressure that breaks up any clathrate slurry shells forming around ellipsoidal gas bubbles.

11. The method according to claim 6 wherein the ambient water temperature is around 2, 3, 4, 5, 6 or 7° C.

\* \* \* \* \*